Jan. 24, 1961
R. D. HARBERTS
2,969,256
METHOD OF AND MEANS FOR STRENGTHENING
THE WHEEL HUB UNITS OF VEHICLES
Filed Feb. 24, 1958
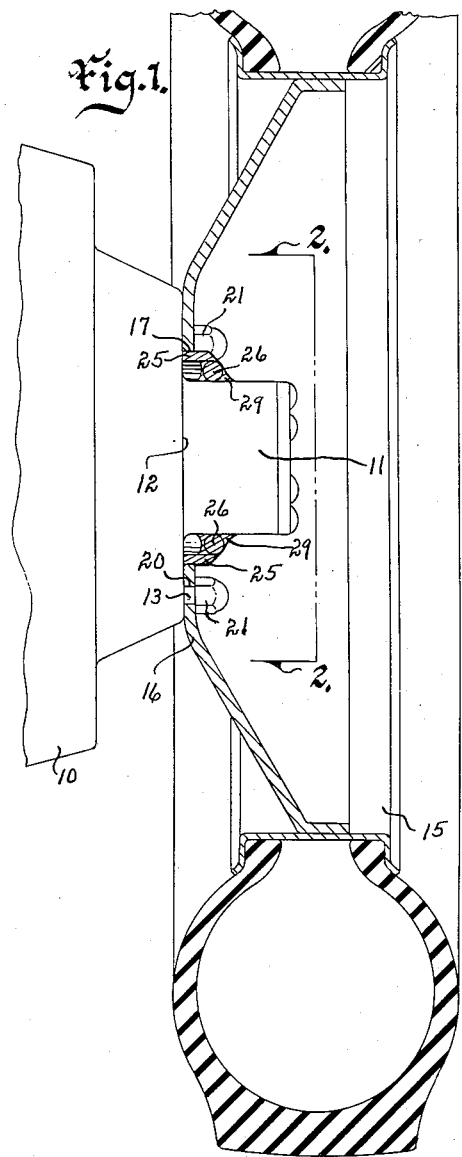
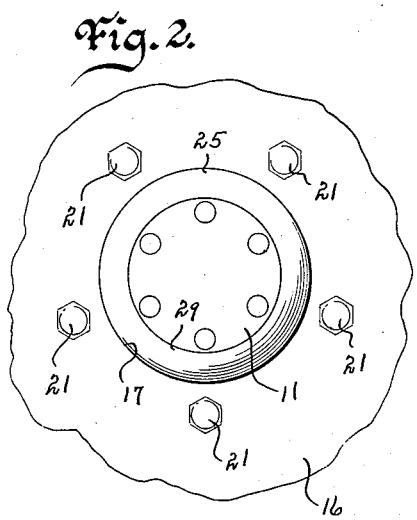
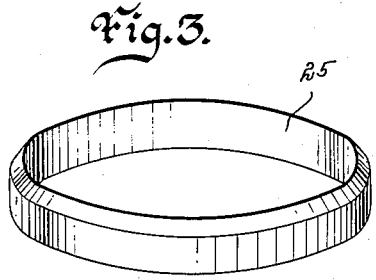
Witness
Edward P. Seeley
Inventor
Richard D. Harberts
by M. Talbert Dick
Attorney United States Patent Office 2,969,256
Patented Jan. 24, 1961

2,969,256
METHOD OF AND MEANS FOR STRENGTHENING THE WHEEL HUB UNITS OF VEHICLES

Richard D. Harberts, Sibley, Iowa
Filed Feb. 24, 1958, Ser. No. 716,900
2 Claims. (Cl. 301—9)

This invention relates to vehicle wheel units and more particularly to a means for preventing the breakdown of a wheel assembly under heavy loads.

Automotive vehicle truckers most frequently have such wheel failures, but even automobiles are subject to these accidents inasmuch as the wheel units of most all vehicles employ substantially the same method of operatively attaching a wheel to the axle shaft. The method is to bolt the vehicle wheel to the axle hub with the bolts serving a dual purpose, i.e., to hold the wheel to the axle hub and also to support all the load. It is for this latter reason that the wheel bolts are constantly being bent or sheared off under heavy loads.

Therefore, one of the principal objects of my invention is to provide a method of and means for preventing the breakdown of vehicle wheels, such as truck wheels, and like, under severe strains or loads.

More specifically, the object of this invention is to prevent wheel unit breakdowns by removing the load support from the wheel attaching bolts.

A further object of my invention is to provide a wheel unit assembly that facilitates the manual placement of a wheel onto and off of a hub shaft.

A still further object of this invention is to provide a means for strengthening wheel units that is easily created.

Still further objects of my invention are to provide a wheel unit strenghtening means that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a vertical sectional view of a wheel unit employing my method of strenghtening the same, Fig. 2 is an enlarged side view of my wheel strengthening means taken from line 2—2 of Fig. 1, and Fig. 3 is a perspective view of my spacing ring.

In these drawings I have used the numeral 10 to generally designate a vehicle axle hub. Such axle hubs have a stub cylindrical axle housing 11, and a flat face area 12 extending radially from the portion 11 as shown in Fig. 1. This flat face 12 carries a plurality of threaded bolt studs 13 forming a circular row around the cylindrical axle housing. The numeral 15 designates a vehicle wheel having the usual center web plate 16. This plate 16 has a large central hole 17 which is spaced apart from the periphery of the axle housing. Also, this web plate 16 has the proper number of holes 20 to embrace the bolt shafts 13, respectively. The numeral 21 designates bolt nuts threaded onto the stub bolt shafts 13. Thus, when a wheel is attachably secured to a hub shaft or drum, the bolts will be required to hold the wheel on and also to support all the load. The wheel may be a single as shown or a dual. Such wheels are heavy and it is a most difficult task to lift a wheel around the hub shaft housing and align the same so that the bolt studs will pass into and through the wheel holes 20.

It is to such a wheel unit that I install my device and which I will now describe in detail. My basic idea is to fill the space between the rim of the hole 17 of the web of the wheel and the cylindrical axle housing in order to relieve any vertical load on the wheel bolts and to pass the same directly to the vehicle axle phase. To do this, I first have a spacer ring sleeve 25 having an outside diameter substantially that of the inside diameter of the wheel hole 17. This ring has a horizontal width substantially greater than that of the thickness of the wheel web. The outer rim edge of this ring 25 extends axially outwardly and radially inwardly from its radially outermost surface at an angle to its bore, as shown in Fig. 3. This spacer ring is secured around the axle housing and with its forward end in engagement with the face 12. Invariably the inside diameter of the spacer ring 25 is still substantially greater than that of the diameter of the axle housing. Obviously the ring 25 must be concentrically mounted around the shaft housing. Therefore, I employ one or more metal rings 26 for placement between the shaft housing and the space ring sleeve 25. These rings are round in cross section and may be of different selective gauges so that when in installing the device the space between the ring sleeve 25 and axle housing will be completely filled. The ring sleeve 25, the ring or rings 26, and the axle housing are all secured together by welding 29 or like as shown in Fig. 1. This welding material 29 should extend as a continuation of the outer edge of the sleeve ring, i.e., axially outwardly and radially inwardly to facilitate and guide the wheel at time of assembly up onto and around the sleeve ring 25. The wheel nuts are screwed onto the bolt shafts in the usual manner for holding the wheel adjacent the face 12. However, all loads will bypass the wheel bolts and any forces will be transferred from the wheel web to the axle phase or vice versa. I have found that trucks equipped with my means do not have wheel failures. The purpose of my invention, of course, is to completely fill the opening 17 of the wheel web so that the bolts 21 will not be required to support the weight. If desired, the hub portion 11 may be fabricated and milled to fit the hole 17 of the wheel web, thereby eliminating the auxiliary build up of the hub, as shown in Fig. 1.

Some changes may be made in my method of and means for strengthening the wheel hub units of vehicles without departing from the real spirit and purpose of my invention, and it is my intention to cover by my claims, any modified methods or use of equivalents which may be reasonably included within their scope.

I claim:

1. In a means for strengthening the wheel hub units of vehicles, a ring member having a circular cross-sectional area, a sleeve ring on the outer periphery of said ring member, at least a portion of the outer perimeter surface area of said sleeve ring being parallel to the center axis of said ring member and said sleeve ring, and means for securing said ring member and said ring together.

2. In a means for strengthening the wheel hub units of vehicles, a ring member having a circular cross-sectional area, a sleeve ring on the outer periphery of said ring member, at least a portion of the outer perimeter surface area of said sleeve ring being parallel to the center axis of said ring member and said sleeve ring, welding material securing said ring member and said sleeve ring together, and at least one side edge of the unit formed by said ring member, said ring sleeve and said welding material being beveled at their outer edges to extend radially inwardly and rearwardly relative to the center axis of said ring member.

References Cited in the file of this patent
UNITED STATES PATENTS

| | | |
|---|---|---|
| 1,405,647 | Williams | Feb. 7, 1922 |
| 1,675,630 | Ash | July 3, 1928 |
| 1,954,757 | Maranville | Apr. 10, 1934 |
| 2,516,896 | Manning | Aug. 1, 1950 |